US008166532B2

(12) United States Patent
Chowdhury et al.

(10) Patent No.: US 8,166,532 B2
(45) Date of Patent: Apr. 24, 2012

(54) DECENTRALIZED ACCESS CONTROL FRAMEWORK

(75) Inventors: Atish Datta Chowdhury, Bangalore (IN); Namit Chaturvedi, Ujjain (IN); Meenakshi Balasubramanian, Bangalore (IN); Arul Ganesh, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 1339 days.

(21) Appl. No.: 11/545,149

(22) Filed: Oct. 10, 2006

(65) Prior Publication Data

US 2008/0086758 A1 Apr. 10, 2008

(51) Int. Cl.

| | |
|---|---|
| ***G06F 21/00*** | (2006.01) |
| ***G06F 7/04*** | (2006.01) |
| ***H04L 9/32*** | (2006.01) |
| ***G06K 19/00*** | (2006.01) |

(52) U.S. Cl. .................... 726/9; 726/1; 726/20; 340/5.6

(58) Field of Classification Search ........................ None
See application file for complete search history.

(56) References Cited

U.S. PATENT DOCUMENTS

| | | | | |
|---|---|---|---|---|
| 4,304,990 | A | | 12/1981 | Atalla |
| 4,454,414 | A | | 6/1984 | Benton |
| 4,839,640 | A | | 6/1989 | Ozer et al. |
| 5,301,100 | A | | 4/1994 | Wagner |
| 5,420,927 | A | | 5/1995 | Micali |
| 5,563,805 | A | | 10/1996 | Arbuckle et al. |
| 5,604,804 | A | | 2/1997 | Micali |
| 5,610,982 | A | | 3/1997 | Micali |
| 5,615,269 | A | | 3/1997 | Micali |
| 5,666,416 | A | | 9/1997 | Micali |
| 5,717,757 | A | | 2/1998 | Micali |
| 5,717,758 | A | | 2/1998 | Micall |
| 5,717,759 | A | | 2/1998 | Micali |
| 5,793,868 | A | | 8/1998 | Micali |
| 5,817,993 | A | | 10/1998 | Kamani et al. |
| 5,836,010 | A | * | 11/1998 | Kim ................................ 726/20 |
| 5,875,432 | A | | 2/1999 | Sehr |
| 5,877,483 | A | * | 3/1999 | Bilich et al. .................. 235/382 |
| 5,960,083 | A | | 9/1999 | Micali |
| 6,014,666 | A | | 1/2000 | Helland et al. |
| 6,067,621 | A | * | 5/2000 | Yu et al. ........................ 713/172 |
| 6,097,811 | A | | 8/2000 | Micali |
| 6,112,263 | A | * | 8/2000 | Futral ............................. 710/37 |
| 6,119,183 | A | | 9/2000 | Briel et al. |
| 6,233,683 | B1 | * | 5/2001 | Chan et al. .................... 713/172 |

(Continued)

FOREIGN PATENT DOCUMENTS

EP 0 886 246 A2 12/1998

(Continued)

OTHER PUBLICATIONS

S.C. Johnson, "Yacc: Yet Another Compiler-Compiler", Technical Report, Murray Hill, Jul. 31, 1978, 33 pp.

(Continued)

*Primary Examiner* — Christopher Revak
(74) *Attorney, Agent, or Firm* — Schiff Hardin LLP

(57) ABSTRACT

A functional architecture is provided for decentralizing the authorization function of an access control system that incorporates user carried access devices, such as smart cards, and door controllers that interact so as to make access decisions. Access to individual rooms is guarded by parameters partially carried by the user carried access devices and partially included in the door controllers.

20 Claims, 5 Drawing Sheets

U.S. PATENT DOCUMENTS

| | | | | |
|---|---|---|---|---|
| 6,292,893 | B1 | 9/2001 | Micali | |
| 6,301,659 | B1 | 10/2001 | Micali | |
| 6,487,658 | B1 | 11/2002 | Micali | |
| 6,498,955 | B1 * | 12/2002 | McCarthy et al. | 700/1 |
| 6,570,487 | B1 | 5/2003 | Steeves | |
| 6,647,388 | B2 | 11/2003 | Numao et al. | |
| 6,766,450 | B2 | 7/2004 | Micali | |
| 6,938,156 | B2 * | 8/2005 | Wheeler et al. | 713/170 |
| 6,957,338 | B1 * | 10/2005 | Sumino | 713/186 |
| 7,047,328 | B1 | 5/2006 | Rosner et al. | |
| 7,055,136 | B2 | 5/2006 | Dzoba et al. | |
| 7,065,210 | B1 | 6/2006 | Tsujii et al. | |
| 7,082,044 | B2 | 7/2006 | Gould et al. | |
| 7,096,494 | B1 * | 8/2006 | Chen | 726/9 |
| 7,181,626 | B1 * | 2/2007 | Rasmussen | 713/185 |
| 7,212,426 | B2 | 5/2007 | Park et al | |
| 7,334,255 | B2 | 2/2008 | Lin et al. | |
| 7,337,325 | B2 | 2/2008 | Ikegami et al. | |
| 7,340,773 | B2 * | 3/2008 | Edwards | 726/20 |
| 7,376,839 | B2 | 5/2008 | Carta et al. | |
| 7,475,812 | B1 | 1/2009 | Novozhenets et al. | |
| 7,540,023 | B2 * | 5/2009 | Ito et al. | 726/20 |
| 7,600,129 | B2 * | 10/2009 | Libin et al. | 713/185 |
| 7,669,054 | B2 * | 2/2010 | Fox | 713/172 |
| 7,752,445 | B2 * | 7/2010 | Satoh | 713/173 |
| 2001/0000814 | A1 | 5/2001 | Montgomery et al. | |
| 2002/0013934 | A1 | 1/2002 | Xie et al. | |
| 2002/0023232 | A1 | 2/2002 | Serani | |
| 2002/0046092 | A1 * | 4/2002 | Ostroff | 705/14 |
| 2002/0166060 | A1 * | 11/2002 | Hsieh et al. | 713/200 |
| 2002/0178003 | A1 | 11/2002 | Gehrke et al. | |
| 2003/0028814 | A1 | 2/2003 | Carta et al. | |
| 2003/0051155 | A1 | 3/2003 | Martin | |
| 2003/0066021 | A1 | 4/2003 | Reggiani et al. | |
| 2003/0106062 | A1 | 6/2003 | Shteyn et al. | |
| 2003/0204751 | A1 | 10/2003 | Jindani et al. | |
| 2004/0088587 | A1 | 5/2004 | Ramaswamy et al. | |
| 2004/0193607 | A1 | 9/2004 | Kudo et al. | |
| 2004/0250112 | A1 | 12/2004 | Valente et al. | |
| 2005/0050482 | A1 | 3/2005 | Keller et al. | |
| 2005/0051620 | A1 | 3/2005 | DiLuoffo et al. | |
| 2005/0052275 | A1 | 3/2005 | Houle | |
| 2005/0055567 | A1 | 3/2005 | Libin | |
| 2005/0068983 | A1 | 3/2005 | Carter et al. | |
| 2005/0080838 | A1 | 4/2005 | Colby et al. | |
| 2005/0114655 | A1 | 5/2005 | Miller et al. | |
| 2005/0114657 | A1 | 5/2005 | Kumar et al. | |
| 2005/0125674 | A1 | 6/2005 | Nishiki et al. | |
| 2005/0132048 | A1 | 6/2005 | Kogan et al. | |
| 2005/0138419 | A1 | 6/2005 | Gupta et al. | |
| 2005/0171982 | A1 | 8/2005 | Deo et al. | |
| 2005/0171983 | A1 | 8/2005 | Deo et al. | |
| 2005/0177658 | A1 | 8/2005 | Perrinot | |
| 2005/0181875 | A1 | 8/2005 | Hoehne | |
| 2005/0278669 | A1 | 12/2005 | Sidle et al. | |
| 2005/0289651 | A1 | 12/2005 | Fages et al. | |
| 2006/0032905 | A1 | 2/2006 | Bear et al. | |
| 2006/0059548 | A1 * | 3/2006 | Hildre et al. | 726/9 |
| 2006/0116970 | A1 | 6/2006 | Scherzer et al. | |
| 2007/0118891 | A1 | 5/2007 | Buer | |
| 2007/0215693 | A1 | 9/2007 | M'Raihi | |
| 2008/0004904 | A1 | 1/2008 | Tran | |
| 2008/0005788 | A1 | 1/2008 | Ramaswamy et al. | |
| 2008/0104705 | A1 * | 5/2008 | Hasbun | 726/26 |
| 2008/0243668 | A1 * | 10/2008 | Ondyak et al. | 705/37 |
| 2009/0061863 | A1 * | 3/2009 | Huggett et al. | 455/434 |
| 2009/0290191 | A1 * | 11/2009 | Imaoka | 358/1.15 |
| 2010/0020344 | A1 * | 1/2010 | Ohtani | 358/1.13 |
| 2010/0066507 | A1 * | 3/2010 | Myllymaki | 340/10.4 |
| 2011/0055900 | A1 * | 3/2011 | Chua et al. | 726/4 |

FOREIGN PATENT DOCUMENTS

| | | | |
|---|---|---|---|
| EP | 0 886 246 | A3 | 12/1998 |
| EP | 0858702 | B1 | 4/2002 |
| EP | 1 320 012 | A2 | 6/2003 |
| EP | 1 811 464 | | 7/2007 |
| WO | WO 01/16759 | A1 | 3/2001 |
| WO | WO 01/42598 | * | 6/2001 |
| WO | WO 03088166 | A2 | 10/2003 |
| WO | WO 03088166 | A3 | 10/2003 |
| WO | WO 2005010685 | A2 | 2/2005 |
| WO | WO 2005010685 | A3 | 2/2005 |

OTHER PUBLICATIONS

A. V. Aho et al., "Compilers Principles, Techniques and Tools", Addison-Wesley, 1986, pp. 25-278, chapters 2, 3 and 4.

Charles Donnelly et al., "Bison the YACC-compatible Parser Generator (Reference Manual)", Free Software Foundation, Nov. 1995, Bison Version 1.25.

W. Thomas, "Languages, Automata, and Logic", Handbook of Formal Languages, G. Rozenberg and A. Salomann, editors, vol. III, Springer, New York, May 1996, 75 pp.

David Ferraiolo et al. "Role-Based Access Control", Reprinted from Proceedings of 15th National Computer Security Conference, Oct. 1992, pp. 1-11.

W. Caelli et al., "Implementation of Active Role Based Access Control in a Collaborative Environment", Information Security Institute, Australia, 1999, pp. 1-37.

S. Jajodia et al., "Flexible Support for Multiple Access Control Policies", ACM Transactions on Database Systems, vol. 26, No. 2, Jun. 2001, pp. 214-260.

OASIS, eXtensible Access Control Markup Language (XACML) Version 2.0, Committe draft 02, Sep. 30, 2004, pp. 1-142.

CORESTREET, "Distributed Certificate Validation", Copyright 2004-2006 CoreStreet Ltd., 18 pp.

Smart Card Alliance, "FIPS 201 and Physical Access Control: an Overview of the Impact of FIPS on Federal Physical Access Control Systems", Sep. 2005, pp. 1-41.

"An Introduction to Role-Based Access Control", NIST/ITL Bulletin, Dec. 1995, 6 pgs.

Internet Archive Wayback Machine Search showing "Finite State Technology" posting from Sep. 9, 1999.

Oliveira et al., "Exact Minimization of Binary Decision Diagrams Using Implicit Techniques" IEEE Transactions on Computers, vol. 47, No. 11, Nov. 1998.

J. Glasgow, "A Logic for Reasoning About Security", ACM Transactions on Computer Systems, vol. 10, No. 3, Aug. 1992, pp. 226-264.

M. Abadi et al., "A Calculus for Access Control in Distributed Systems", ACM Transactions on Programming Languages and Systems, vol. 15, No. 3, Sep. 1993, pp. 706-734.

E. Bertino et al., "An Access Control Model Supporting Periodicity Constraints and Temporal Reasoning", ACM Transactions on Database Systems, vol. 23, No. 3, Sep. 1998, pp. 2.

Sheldon Akers, "Binary Decision Diagrams" IEEE Transactions on Computers, vol. C-27, No. 6, Jun. 1978.

Helleseth et al., "Security of Jump Controlled Sequence Generators for Stream Ciphers", Springerlink.com webpage.

Kenneth Short, "Embedded Microprocessor Systems Design: An Introduction Using the Intel 80C188EB", copyright 1998.

Helleseth et al., "Security of Jump Controlled Sequence Generators for Stream Ciphers", SETA 2006, LNCS 4086, pp. 141-152, Sep. 21, 2006.

Nils Klarlund et al., "MONA Version 1.4 User Manual", BRICS, Basic Research in Computer Science, Jan. 2001, 83 pp.

J. G. Henriksen et al., "MONA: Monadic Second-Order Logic in Practice", BRICS, Basic Research in Computer Science, RS-95-21, May 1995, 20 pp.

A. B. Sandholm et al., "Distributed Safety Controllers for Web Services", BRICS, Basic Research in Computer Science, RS-97-47, Dec. 1997, 15 pp.

Jean-Francis Michon et al., "Automata and Binary Decision Diagrams", Automata Implementation Lecture Notes in Computer Science, Springer-Berlin Heidelberg 1999, vol. 1660.

W. Rank et al., Smart Card Handbook, 3rd ed. Jan. 1, 2003, J. Wiley & Sons Ltd, pp. 165-169, retrieved from Internet Jan. 15, 2008.

"Smart Cards" by Cornerstone Lab, from www.c-lab.com/smartCard.html, posted on the internet on Jan. 25, 2005.
"Internet Archive Wayback Machine" shows Jan. 25, 2005 posting of "Smart Cards" by Cornerstone Lab.
Enrique Ortiz, "An Introduction to Java Card Technology—Part 1", May 29, 2003.
Ronald M. Kaplan, "Finite State Technology", Xerox Palo Alto Research Center, posted on the internet Sep. 9, 1999.
D. Kozen, "Automata and Computability ," Springer-Verlag, 1997, pp. 14-127, chapter titled "Finite Automata and Regular Sets".
A. Menezes et al., "Hash Functions and Data Integrity", Chapter 9 from the Handbook of Applied Cryptography and including p. 347 which describes the algorithm MD5, CRC Press, 1996, pp. 320-383.
P. Bonatti et al., "A Modular Approach to Composing Access Control Policies", in Proc. 7th ACM Conference on Communications and Security, Aug. 2000, pp. 164-173.
L. Giuri et al., "A Formal Model for Role-Based Access Control with Constraints", in Proc. of the Computer Security Foundations Workshop, 1996, pp. 136-145.
S. Micali, "Efficient Certificate Revocation", Technical Memo, Massachusetts Institute of Technology/Laboratory for Computer Science/TM-542b, 1996, pp. 1-10.
S. Osborn et al., "Configuring Role-Based Access Control to Enforce Mandatory and Discretionary Access Control Policies", ACM Trans. on Information and System Security, vol. 3, No. 2, May 2000, pp. 85-106.
A Smart Card Alliance White Paper, "Contactless Technology for Secure Physical Access: Technology and Standards Choices", Oct. 2002, pp. 1-36.
A Smart Card Alliance White Paper, "Using Smart Cards for Secure Physical Access", Jul. 2003, pp. 1-54.
S. Barker et al., "Flexible Access Control Policy Specification with Constraint Logic Programming", ACM Trans. on Information and System Security, vol. 6, No. 4, Nov. 2003, pp. 501-546.
R. Sandhu et al., "Role-Based Access Control Models", IEEE Computer, vol. 29, No. 2, 1996, pp. 38-47.

* cited by examiner

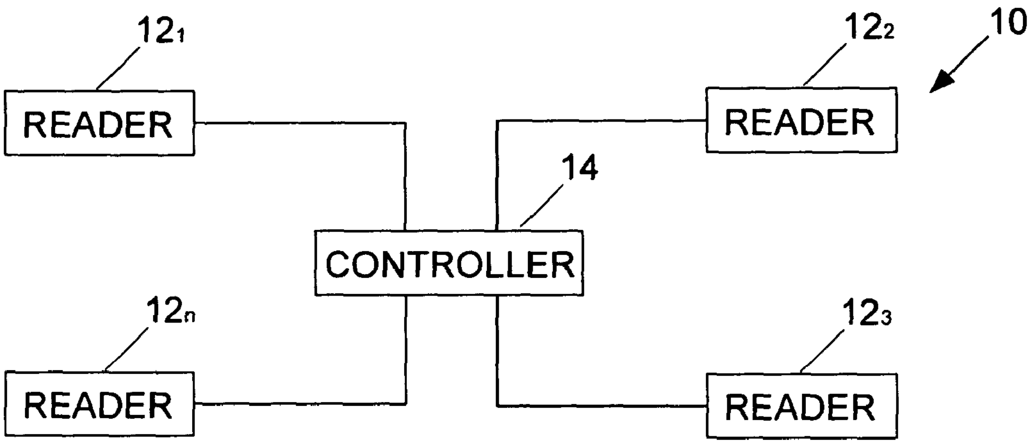
*Fig. 1-Prior Art*
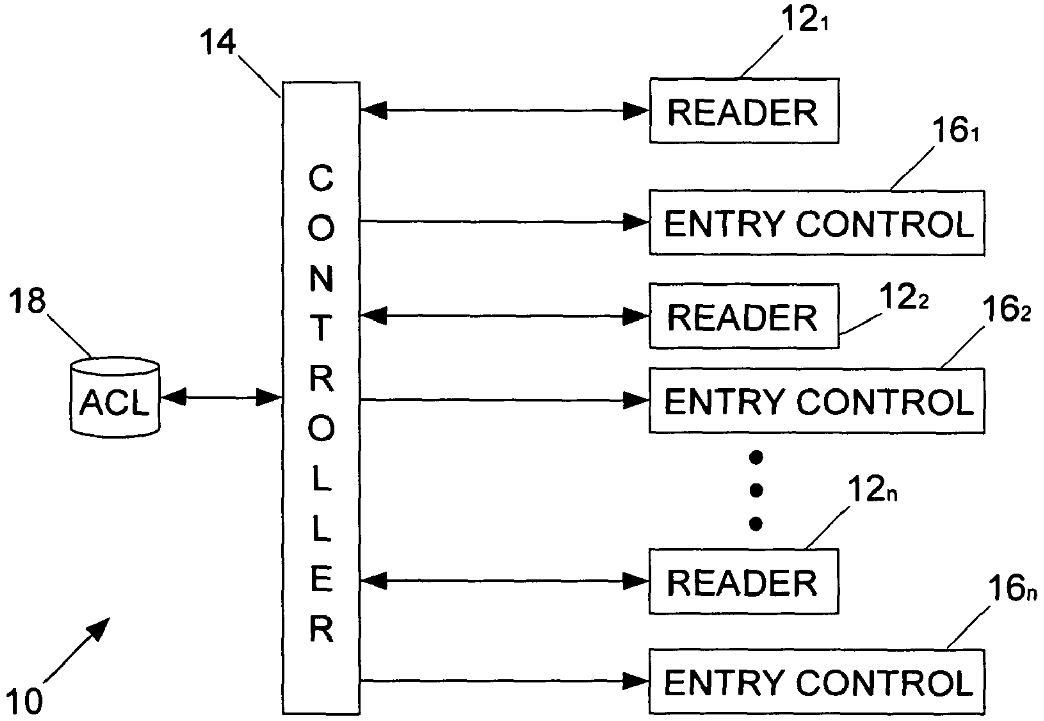
*Fig. 2-Prior Art*

DECENTRALIZED ACCESS CONTROL FRAMEWORK

TECHNICAL FIELD OF THE INVENTION

The present application relates to decentralizing the authorization function in the context of physical access control.

BACKGROUND OF THE INVENTION

Access control is frequently implemented to control the access of users to resources and/or to make decisions about denying or granting access to those resources. In the context of physical access control, these resources are typically rooms or, more generally, restricted areas guarded by entrances or doors.

The goal of authorization in access control is usually to specify and evaluate/look-up a set of policies that control the access of users to resources, i.e., making decisions about denying or granting access of users to resources. The goal of secure authorization is usually to communicate this decision in a secure manner. The goal of authentication is usually to verify that a user is who the user says he or she is. The focus herein is primarily on authorization.

As shown in FIGS. 1 and 2, an access control system 10 traditionally includes card readers $\mathbf{12}_1$, $\mathbf{12}_2$, . . . , $\mathbf{12}_n$ connected to a centralized controller 14. The card readers $\mathbf{12}_1$, $\mathbf{12}_2$, . . . , $\mathbf{12}_n$, for example, are typically stationed at doors or other access points to restricted areas. Each of the card readers $\mathbf{12}_1$, $\mathbf{12}_2$, . . . , $\mathbf{12}_n$ reads access cards carried by the users, and the card readers $\mathbf{12}_1$, $\mathbf{12}_2$, . . . , $\mathbf{12}_n$ communicate information read from the access cards to the centralized controller 14. Locks or other entry control devices $\mathbf{16}_1$, $\mathbf{16}_2$, . . . , $\mathbf{16}_n$ at the access points to the restricted areas are subsequently instructed by the centralized controller 14 to either permit or deny access. The card readers $\mathbf{12}_1$, $\mathbf{12}_2$, . . . , $\mathbf{12}_n$ communicate with the centralized controller 14 for every access request. Each of the locks or other entry control devices $\mathbf{16}_1$, $\mathbf{16}_2$, . . . , $\mathbf{16}_n$ usually correspond to one of the card readers $\mathbf{12}_1$, $\mathbf{12}_2$, . . . , $\mathbf{12}_n$ and are located at the same access point.

In many access control systems, such as the access control system 10 shown in FIGS. 1 and 2, neither the card readers $\mathbf{12}_1$, $\mathbf{12}_2$, . . . , $\mathbf{12}_n$ nor the access cards have any appreciable processing, power, or memory themselves. Hence, such card readers $\mathbf{12}_1$, $\mathbf{12}_2$, . . . , $\mathbf{12}_n$ and access cards are usually referred to as passive devices.

By contrast, the centralized controller 14 of the access control system 10 is usually a well designed and sophisticated device with fail-over capabilities and advanced hardware and algorithms to perform fast decision making.

The decision making process of the centralized controller 14 of the access control system 10 is fundamentally based on performing a lookup in a static Access Control List (ACL) 18. The ACL 18 contains static policy based rules (e.g., one rule in the ACL 18 might provide that user X is not allowed entry into room R), which change only when the policy changes (e.g., the ACL 18 might be changed to provide that user X can henceforth enjoy the privileges of room R).

Policies are implemented in a set of rules that governs authorization. The static ACL based policies as mentioned above can be viewed as context-independent policies. In contrast, context-sensitive policies will require a dynamic evaluation of different states of the system including the user's past history of activities. This evaluation is referred to as dynamic authorization.

With the interconnect architecture of FIGS. 1 and 2, and with a reasonable number of users of a protected facility, the access control system 10 using static ACL based policies makes decisions quickly, is reliable, and is considered to be reasonably robust. It may be additionally noted that, in current access control systems, context-sensitive policies typically constitute a small fraction of the total policies governing the operation of the system.

It is expected that buildings and facilities of the future will require increasingly more intelligent physical access control solutions. For example, access control solutions are being provided with the capability to detect such conditions as intrusion and fire. In general, this increased capability implies that such access control solutions should be provided with the ability to specify conditions that are dynamically evaluated, e.g., disable entry to a particular room in case of a break-in, and/or disable entry to a particular room if its occupancy reaches its capacity limit, and/or allow entry to a normal user only if a supervisor is already present inside the room, etc. This increased capability leads to a significant emphasis on the need for dynamic authorization. That is, if context-sensitive policies form a significant part of the access control policies of a facility, then the facility will appear to adapt its access control enforcement in keeping with the changes in the system. Thus, the facility will appear to be more intelligent as compared to facilities having a lesser number of context dependent, access control policies.

Such dynamic authorization can be centrally implemented with the current architecture (FIG. 1 and 2). This centralized implementation will require the context information pertaining to every possible policy to be continuously gathered at the central controller, and upon a request, the controller needs to evaluate this context and needs to arrive at a dynamic authorization decision.

While this process can work for small facilities, such a centralized solution will not scale up well with an increase in the number of users, size of the facility, or complexity of the context-sensitive policies, since progressively more and more information will have to be pushed from various sources to the central controller.

Due to reasons of flexibility and ease of installation and modification, a general purpose network (e.g., an Internet Protocol (IP) network of a facility) is more attractive for an access control solution in comparison with the special purpose dedicated connections between the various devices and the central controller in FIGS. 1 and 2.

As shown in FIG. 3, an access control system 20 using a more generic interconnect architecture may include card readers $\mathbf{22}_1$, $\mathbf{22}_2$, . . . , $\mathbf{22}_n$ connected to a network 24 that is either a wired only network, or a wireless only network, or a mixed wired and wireless network. The network 24 includes controllers $\mathbf{26}_1$, . . . , $\mathbf{26}_n$ and servers $\mathbf{28}_1$, . . . , $\mathbf{28}_n$. The architecture of FIG. 3 is not suitable for the centralized access control system 10 shown in FIGS. 1 and 2. This unsuitability is due to the fundamental dependency on the central controller for every decision, i.e., a system architecture that necessitates a guaranteed reader-to-controller communication for every access decision will not be a good choice for the more generic and flexible interconnect architecture (such as that shown in FIG. 3).

The present application focuses primarily on a decentralized policy evaluation framework for dynamic authorization. Addressed herein are issues of scalability related to dynamic authorization as raised above. The present invention as set out in the claims hereof enables an access control system to leverage a more general purpose network, e.g., the IP network of a facility.

Most work in the domain of facility access control is based on a model having a door D that receives an input I (including user id) from an access card (or some other device carried by an user), that sends information i (where i=f (I)) to a central controller E, and that receives a response R from the central controller E. The response R indicates whether or not access is allowed.

A purely centralized implementation of access control has only one controller E, whereas a slightly more scalable solution that has multiple controllers with different levels or hierarchies and data caching is shown in European Application EP1320012A2.

U.S. Pat. No. 6,570,487 describes an arrangement that is intended to improve the robustness of communications from the doors to the access controllers by providing redundancy of receivers and access controllers (referred to as distributed receivers and distributed access controllers in the literature).

One fundamental problem addressed by work related to access control is that of a secure transmission of the response R from the controller E to the door D rather than of determining the response R per se. It may be recalled that determining the privilege grant content of the response R, i.e., computing what should be the access permission, given a certain door D and input I, is the problem of authorization.

Core Street has described a technique for making the controller E to door D communication more secure by enabling the door D to figure out if the response R is valid, given the input I. Only the controller E can generate the response R and this response can then be made publicly available. That is, the response R cannot be generated by a non-controller E given the input I and previous responses on similar transactions.

Thus, as detailed in U.S. Published Application 20050055567, a barrier to access is provided that includes a controller and at least one administration entity. The controller selectively allows access, and the at least one administration entity generates credentials/proofs. According to the barrier, no valid proofs are determinable given only the credentials and values for expired proofs. The controller receives the credentials and proofs, the controller determines if access is presently authorized, and, if access is presently authorized, the controller allows access.

Document WO2003088166A2 shows how the door D can verify the response R by making use of a one way hash function H ($N_I$) (where $N_I$ is dependant on the input I), and an elapsed time interval of which the door D keeps track. A related document WO2005010685 underlines how this strategy can be useful for disconnected doors—where essentially the response R will be carried by the access card.

U.S. Published Application 20030028814 describes a generic microcontroller enabled door reader that can communicate with a smart card. However, its functional architecture uses the card and reader interaction to establish the authenticity of the card and not for authorization.

In the last 10-15 years, significant research efforts have been directed towards coming up with an authorization framework, inclusive of a policy specification language and a well defined authorization model that supports dynamic authorization. To a large extent, these frameworks focus on languages that provide flexibility in specifying role based policies and guarantees unambiguous evaluation (decision) with feasible bounds on the run time, and implicitly assume a centralized implementation of the policy evaluation. These approaches concentrate more on access control as modeled on computer systems in general and not on physical access control in buildings. Consequently, while they underline the need and importance of context-dependent or dynamic evaluation of access control policies, the functional architecture remains centralized and focused on languages that provide flexibility in specifying role based policies and guarantees unambiguous evaluation (decision) with feasible bounds on the run time.

U.S. Pat. No. 6,647,388 discloses that an access request can be used to extract a policy condition and that the policy condition is evaluated to determine if there is sufficient information available to evaluate, to obtain the necessary information if there is insufficient information to reach a proper decision, and then to grant or deny access on the basis of the evaluated information. However, this processing was designed for access control in computer systems in general and, hence, its functional architecture differs from that of the present invention.

Similarly, U.S. Published Application 20050068983 includes a context based access control policy, but is more geared towards software systems where the requesting agent can wait for all the necessary context evaluations to be performed by a separate service module.

U.S. Published Application 20050080838 presents a flexible architecture for dynamic policy evaluation in the context of web-services and is significantly different in the functional modules from the present invention. U.S. Pat. No. 6,014,666, U.S. Published Application 20050132048(A1), U.S. Published Application 20030204751(A1), and U.S. Published Application 20050138419(A1) also discuss similar access control mechanisms in the context of general computer systems and software agents.

There exist applications and standards that use smart cards where per user information is written back to the cards from specific terminals/controllers that they interact with (e.g., MONEO and CEP). An example is the electronic purse. However, these applications concentrate more on security issues and not so much on the context-dependent run-time policy evaluations.

The recent draft of XACML (extensible Access Control Markup Language Version 2.0) under OASIS also addresses access control of general computer systems and focuses on the policy language model. It does include the vision of a distributed access control based on a request response model of many participating entities, and lays down the request/response language protocols for exchanging access control decisions. Thus, it streamlines the terms and their scopes in the context of access control on an internet based network of computing resources, and lays down recommendations of various kinds of data exchanges (and their suggested formats). However, it does not identify any particular functional architecture for decentralized user access control in relation to large facilities.

The present invention solves one or more of these or other problems.

SUMMARY OF THE INVENTION

According to one aspect of the present invention, a decentralized access control system is provided to make decentralized access authorization decisions. The system comprises the following: at least one access controlling device and at least one user carried device. The access controlling device provides a first parameter that enables a decision relating to access authorization of a user. The at least one user carried device is carried by the user and interacts with the access controlling device, the user carried device stores a second parameter that enables the decision relating to the access authorization of the user at the instance of presenting the user carried device to the access controlling device, and the decision is made as a function of both the first parameter and the second parameter.

According to another aspect of the present invention, a smart card, which is useful in a decentralized access control system whereby access authorization decision making is decentralized, comprises a memory and a processor. The memory stores policy rules, the policy rules enable decisions to be made at instances of presenting the smart card to an access controller controlling access to a restricted area, and the decisions relate to access to the restricted area by a user of the smart card. The processor is coupled to the memory and is arranged to enable the decisions based upon the policy rules and a system context transmitted to the smart card. The system context is based on an environment relating to the restricted area.

BRIEF DESCRIPTION OF THE DRAWINGS

These and other features and advantages will become more apparent from a detailed consideration of the invention when taken in conjunction with the drawings in which:

FIGS. 1 and 2 show a traditional centralized access control system;

DETAILED DESCRIPTION

Figure 3:
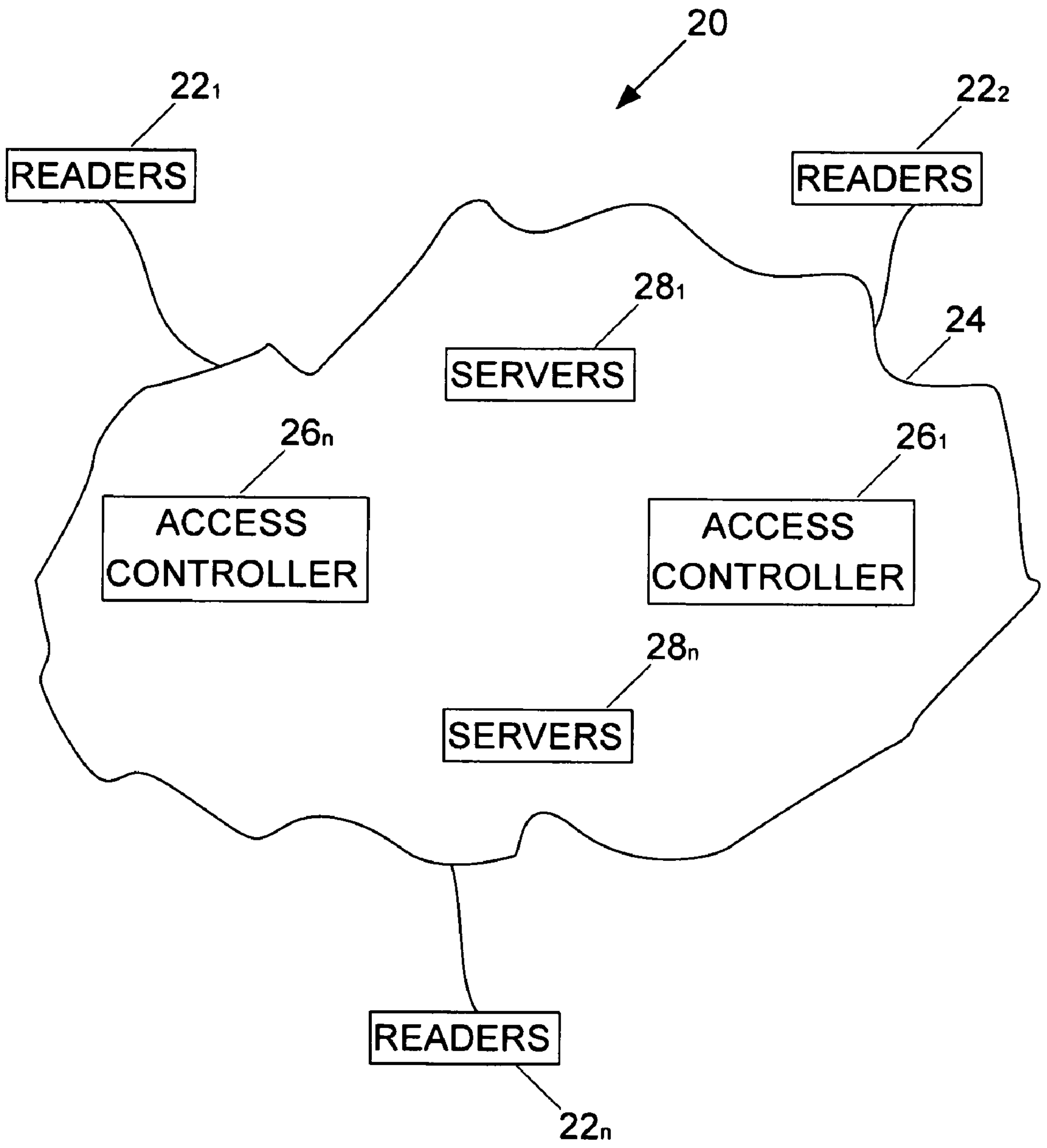
FIG. 3 shows a generic interconnect architecture that can be used for access control system.

The domain of the control of physical access to a facility involves users (who are free to move) making requests (e.g., swiping a card, pointing a device, etc.) to some physical device (e.g., reader, processor, etc.) for access to some resource. For example, facility access control that guards a user's physical entry/exit to/from a room or other similar restricted area exemplifies this physical access control space. Facility access control specifies and enforces a set of policies/rules that dictate access of users to spaces such as rooms. Authorization deals with the issues of determining whether to grant or deny access as per the policies/rules that are conditional on dynamically changing aspects of the system.

This issue of authorization is addressed herein, as distinct from issues relating to security (i.e., secure communication of authorization decisions) and authentication (identification of an user). Existing access control systems primarily address static policies and typically involve a centralized implementation strategy where all the policies are stored as an access control list (ACL) in a central controller. The readers of existing access control systems are installed at various doors and communicate with the central controller for every access request. These readers receive the allow/deny decisions from the controller, and communicate the decisions back to the user requesting access. This solution cannot be adequately scaled up to meet the needs of future buildings where it is envisioned that (i) the policies/rules are predominantly context-sensitive, (ii) there will be a large number of users, and (iii) connections between readers and controllers will leverage a generic building network. A reader-controller communication for every access request in such a scenario will not be scalable.

Therefore, according to one embodiment of the present invention, authorization is decentralized and, consequently, does not rely on communications between the readers and a central controller for access decisions.

According to this embodiment of the present invention, users carry devices such as smart cards on which the policies dictating the access of users are stored. These access controlling policies are system context dependent. For example, one policy might provide that a requesting user is allowed access only if the occupancy of the room is less than or equal to a predetermined capacity limit, such as 20 occupants. In such a case, an allow or deny decision is dictated by the system context involving the occupancy of the room.

Policies may be specified in a formal language and stored as an executable on the smart cards. System context information is obtained dynamically from the system. Upon an access request from a user, the policies stored on his/her smart card are executed along with the system context information, and an allow/deny decision is made by the smart card and the reader that is installed at the portal to the room to which the card holder desires access. Per-user state information is then written back to the smart card.

Figure 4:
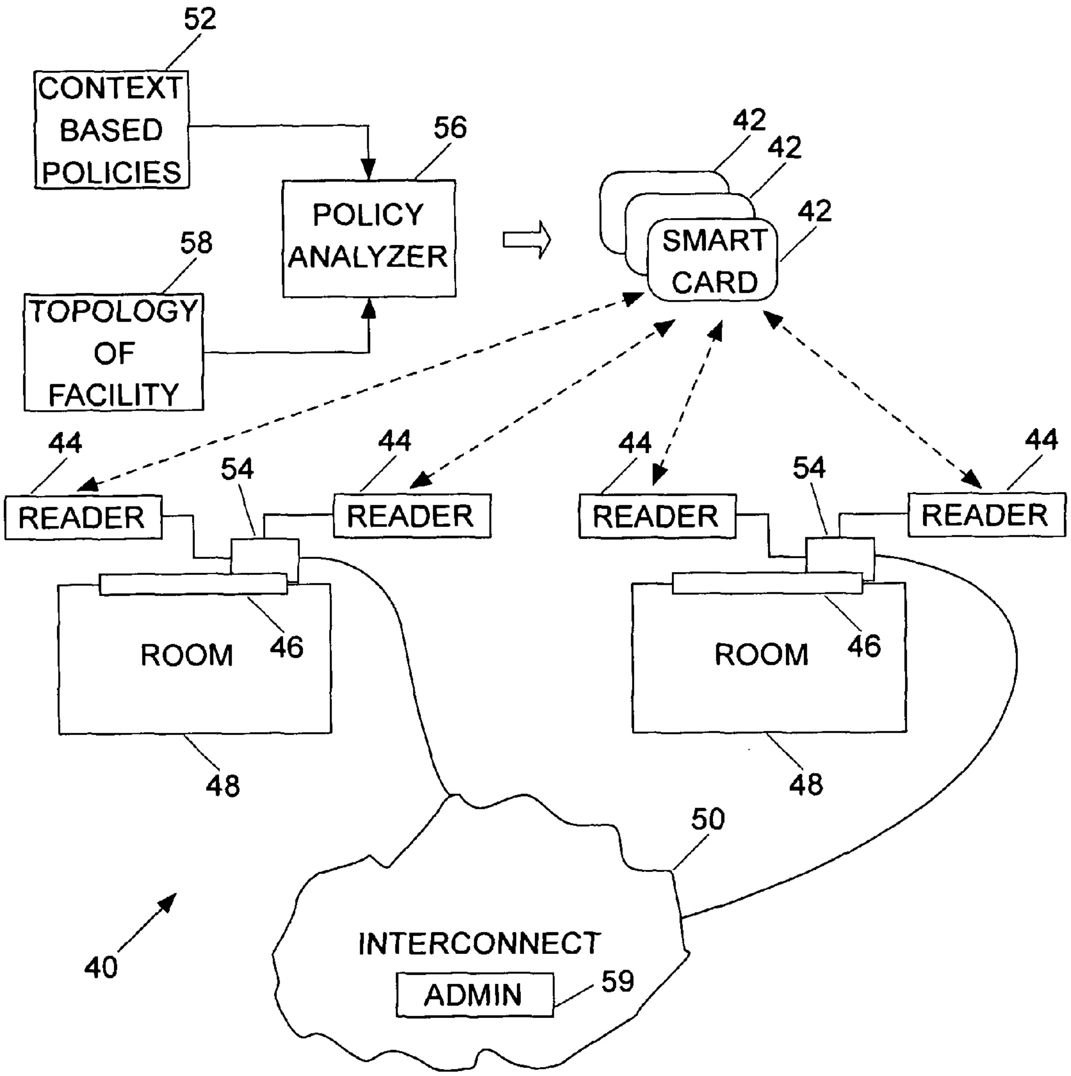
FIG. 4 shows an access control system according to an embodiment of the present invention.

One embodiment of an access control system 40 for the control of access to a building with interconnects is shown in FIG. 4. The access control system 40 implements de-centralized access control (DAC), which is not to be confused with Discretionary Access Control. The de-centralized access control, for example, may be arranged to fall within the domain of non-discretionary access control.

The access control system 40 includes user-carried devices 42 (e.g., smart access cards), readers 44 (e.g., device readers), access agents 46 (e.g., portals such as doors), resources 48 (e.g., protected areas such as rooms), an interconnect 50, policies 52 that are context sensitive and dynamic, and controllers 54.

The user-carried devices 42 have built in computational capabilities and memories, as opposed to passive cards that are commonly used today. Users are required to carry the user-carried devices 42. The user-carried devices 42 are more simply referred to herein as smart cards. However, it should be understood that the present invention can also relate to user-carried devices other than smart cards.

The readers 44 at the doors or other portals are able to read from and write to the user-carried devices 42.

The access agents 46 are access control enabled. The access agents 46 are more simply referred to herein as doors. However, it should be understood that the present invention relates to access agents other than doors. Each of the doors 46, for example, may be arranged to have one or more readers 44. For example, each of the doors 46 may be arranged to have two readers 44 with one of the readers 44 on each side of the corresponding door 46. Also, each of the doors 46, for example, may be arranged to have a corresponding one of the door controllers 54. The door controller 54 is connected to the reader 44 and has an actuator for locking and unlocking the corresponding door 46. The door controller 54 will usually have a wireless/locally wired communication component and some processing capabilities. Each reader can have its own controller too. Also, the functionality of the door controller 54 and the reader 44 can be folded into one integrated unit as well, and a door may have two such units on either side.

The resources 48, for example, may be enclosed spaces or other restricted areas. Access to the resources 48 is permitted by the doors 46 with each of the doors 46 being provided with a corresponding one of the door-controllers 54 to control access through a corresponding one of the doors 46 and into a corresponding one of the resources 48.

The interconnect 50 interconnects the door controllers 54 and is typically a mix of wired and wireless components, and can leverage the facility IP network. It should be understood that the interconnect 50 may instead comprise only wired components or only wireless components, that the wired components may include regular network cables, optical fibers, electrical wires, or any other type of physical structure over which the door controllers 54 can communicate, and that the wireless components may include RF links, optical links, magnetic links, sonic links, or any other type of wireless link over which the door controllers 54 can communicate.

The policies 52 include authorization policies that depend on a system context (e.g., refuse entry if the number of people in a room is more than a threshold) and that can be altered dynamically.

The smart cards 42 carry information about all the access policies 52 of the corresponding user. Upon an access request, the access decision is made locally by virtue of the interaction between the smart card 42, which carries the policies 52, and the door controller 54, which supplies the context information. In one embodiment, the smart card 42 can use the policy and both the system context and the user's history in order to make a decision regarding the request for access by the user through the door 46.

The interconnect 50 is used to transfer system-level information to the door-controllers 54 and to program the door-controllers 54.

One example of system level information can be administrative actions, like raising the security level of a facility to high, which need to be communicated to all or to at least some of the door controllers 54 using the interconnect 50.

Another example can be local information as collected from different door controllers 54 of a particular room in order to locally compute the room occupancy using the interconnect 50 to talk amongst themselves. The logs of the different door controllers 54 are also periodically pushed to a central place using the interconnect 50.

The users are expected to re-program, re-flash, or otherwise alter the policies 52 stored on their smart cards 42 on an agreed upon granularity so that they can reflect any change in the policies 52. In specific instances, all or some door controllers 54 may be instructed to reflash the policies of certain users or a group of users by using the readers 44 attached to the controllers 54 to reflash the user carried devices 42.

Thus, instead of a central controller storing all policies as is done in traditional access control systems, the pertinent portions thereof (i.e., of the policies 52) are stored on the user's smart card 42 in connection with the access control system 40. The door controller 54 and the smart cards 42 communicate with one another in order to choose the correct policy and hence control access to the room 48.

The policies 52 stored on the smart card 42 may be personal to the user possessing the smart card 42. For example, the smart card 42 of user A may contain a policy specifying that user A is permitted access to a room only if user B is already in the room. However, the smart card 42 of user C may contain no such policy.

To implement and enforce context-sensitive policies, the smart cards 42 carry a policy rule-engine instead of static policies. The door-controllers 54, by virtue of the interconnect 50, imposes the system context. The system context, in conjunction with the rule-engine on the smart cards 42, dynamically makes the access decisions.

Thus, the policies 52 are analyzed by a policy analyzer 56 in conjunction with a facility topology 58, are converted into user-specific rule engines, and are programmed into the smart cards 42. The door controllers 54 are also programmed/configured by the analyzer 56 in order for them to evaluate the system context in a distributed manner. The door controllers 54 can write user specific history into the smart cards 42 at runtime. The policies 52 are combined with the system context imposed by the door-controllers 54 in order to make access decisions.

As an example, one of the rules that is produced by the policy analyzer 56 from the policies 52 might specify that entry into a particular one of the rooms 48 (identified by the facility topology 58) is allowed only if occupancy in this particular room is less then twenty (e.g., the capacity limit of this room). The context of this policy is the current occupancy of this room. The door controller 54, which is charged with imposing the system context, maintains a count of the occupants of the room. When a user with a smart card 42 that has the rule engine corresponding to the above policy requests access to the room, the policy is evaluated by the smart card 42 after applying the system context which it receives from the door controller 54 and makes the access decision to grant or deny access.

The policies 52, for example, may be specified using a formal logical language. The formal logical language may be built on top of certain elementary relations over events and variables using Boolean operations and quantification. The events may be atomic entities relating to the system context and the movement of users inside a facility. The variables may be place holders used to quantify over events. The relationship between an event and a variable determines how a variable represents a particular event and the order of occurrence of events.

An administrator can define the policies 52 in a high level English-like specification, which follows a grammar. The grammar in this context refers to a language generation rule. The policy analyzer includes a high level policy parser that parses the policies 52 input by the administrator in accordance with the grammar and translates the policy input into a formal logical language.

One formal logical language that can be used for this purpose is the Monadic Second Order (MSO) Logic. This logic is parameterized by a set of events, where events are entities that represent access control requests, decisions, and system context (e.g., a room reaching its maximum occupancy). The events may thus be atomic entities relating to the system context and the movement of users inside a facility. The formal logical language may be built on top of certain elementary relations over events and variables using Boolean operations and quantification. In summary, the syntax of the formal policy language can be MSO logic, tuned to the context of access control, e.g., using application specific knowledge to define the relations over events.

The high level parser of the policy analyzer 56 works by first parsing the high level policy to extract pieces of templates for which pre-designated Monadic Second Order formulas can be substituted. The Monadic Second Order formulas of the pieces of templates are then put together, e.g., by means of conjunctions or disjunctions, by the high level parser to obtain a single Monadic Second Order formula corresponding to the policy.

The parser uses knowledge of the application domain to effectively perform the translation. Once a grammar for the high-level English-like specification is defined according to the needs of the access control application, parsing can be carried out using well known parsing techniques available from Alfred V. Aho, Ravi Sethi, Jeffrey D. Ullman in "Compilers Principles, Techniques, Tools", Reading, Mass., Addison-Wesley, 1986, and well known tools disclosed by S. C. Johnson in "YACC—Yet another compiler compiler", Technical Report, Murray Hill, 1975, and by Charles Donelly and Richard Stallman in "Bison: The YACC-Compatible Parser Generator (Reference Manual)", Free Software Foundation, Version 1.25 edition, November 1995.

In order for the policies specified in Monadic Second Order Logic thus obtained to be operational in terms of enforcing access, they have to be converted into computational/executable machine models. These machine models can then be stored in appropriate locations for execution. Conventional finite state automata may be used as the machine models that execute these policies. A language analyzer of the policy analyzer 56 may be used to constitute the set of algorithms that convert the policies specified in Monadic Second Order Logic into their equivalent finite state automata. A language analyzer algorithm follows well-known theoretical techniques for converting formula into automata. Theorems and techniques from Thomas, W. in "Languages, automata and logic," in Handbook of Formal Languages, Vol. III, Springer, N.Y., 1997, pp. 389-455 can be implemented as an algorithm for this language analyzer. The automata can then be stored in user carried devices to carry out the decentralized authorization. These automata act as rule engines executing the policies 52, since, as mentioned above, their construction allows precisely those behaviors that satisfy the policies. All of the policies 52 corresponding to a particular user are collected together and converted into executable automata which are then stored on the user's smart card 42.

The policy analyzer also use the topology 58 of the facility in which the access control system is to be used. That way, the executable automata are tailored for this topology. The door controllers 54 may also be programmed/configured by the analyzer 56 in order for them to evaluate the system context in a distributed manner.

Accordingly, when a user requests access to a room 48, the corresponding door controller 54 initiates execution of those of the policies 52 stored in the user's smart card 42, which results in an access decision (allow/deny) that is unique to that user and to that room.

The parser and the language analyzer are together referred to in this disclosure as the high level analyzer or the policy analyzer or simply the analyzer 56.

Examples of dynamic policy types that can be specified using the formal logical language referred above include the following: assisted access, whereby one user can enter the facility only when another designated user is available to provide access; anti-pass back, whereby re-entry is denied if a user is found to have made an unrecorded exit after a valid entry; system state based policies, whereby access is limited, for example, by the number or category of users inside a room; and, temporal policies, whereby a user has access to a facility only during specific interval of time. Different or other policies may be implemented.

The policy analyzer 56 analyzes and converts the policies 52 into their equivalent finite state automata. These automata act as rule engines executing the policies 52. They are constructed to allow precisely those behaviors that satisfy the policies. All of the policies 52 corresponding to a particular user are collected together and converted into executable automata which are then stored on the user's smart card 42. When the user requests access to a room 48, the corresponding door controller 54 initiates execution of those of the policies 52 stored in the user's smart card 42, which results in a an access decision (allow/deny) that is unique to that user.

The interconnect 50 may be arranged to include a system administrator 59 some of whose functions are discussed below.

Figure 5:
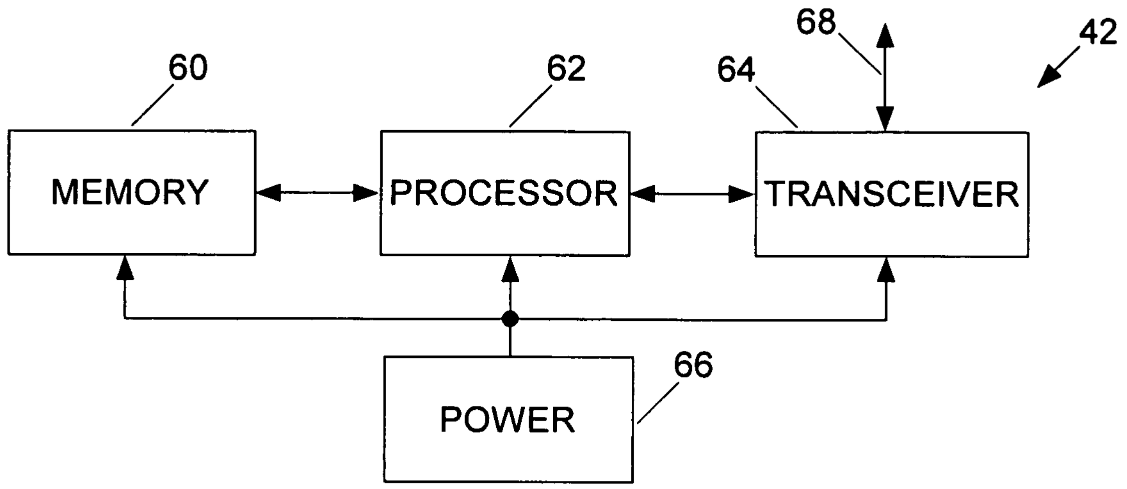
FIG. 5 shows a representative one of the smart cards of FIG. 4.

A representative one of the smart cards 42 is shown in FIG. 5. The smart card 42 includes a memory 60, a processor 62, a transceiver 64, and a power source 66. The memory 60, for example, may be a flash memory and stores the rule engine that enforces the policies 52 targeted to the user carrying the smart card 42.

The smart card 42 may be arranged to respond to a generic read signal that is transmitted continuously, periodically, or otherwise by the reader 44, that is short range, and that requests any of the smart cards 42 in its vicinity to transmit its ID, and/or a request for system context, and/or other signal to the reader 44. In response to the read signal, the smart card 42 transmits the appropriate signal to the reader 44.

Accordingly, when the user presents the user's smart card 42 to the reader 44, the transceiver 64 receives from the reader 44 at least the system context provided by the door controller 54. Based on this system context and the policies 52 stored in the memory 60, the processor 62 makes the access decision to grant or deny the user access to the room 48 associated with the reader 44 to which the user's smart card 42 is presented. The processor 62 causes the grant decision to be transmitted by the transceiver 64 to the reader 44. If desired, the processor 62 may be arranged to also cause the deny decision to be transmitted by the transceiver 64 to the reader 44.

The memory 60 may also be arranged to store a personal ID of the user to which the access card is assigned. When the user presents the smart card 42 to the reader 44, the processor 62 may be arranged to cause the user's personal ID to be transmitted by the transceiver 64 to the reader 44. In this manner, particular users may be barred from specified ones of the rooms 48, and access by specific users to specific rooms, etc. may be tracked. Also, the door controllers 54 can be arranged to provide back certain system contexts that are targeted to particular users.

The memory 60 can also store other information.

The processor 62, for example, may be a microcomputer, a programmable gate array, an application specific integrated circuit (ASIC), a dedicated circuit, or other processing entity capable of performing the functions described herein.

The power source 66 may be a battery, or the power source 66 may be arranged to derive its power from transmissions of the readers 44, or the power source 66 may be any other device suitable for providing power to the memory 60, the processor 62, and the transceiver 64.

The transceiver 64 transmits and receives over a link 68. The link 68 may be a wired link or a wireless link.

Figure 6:
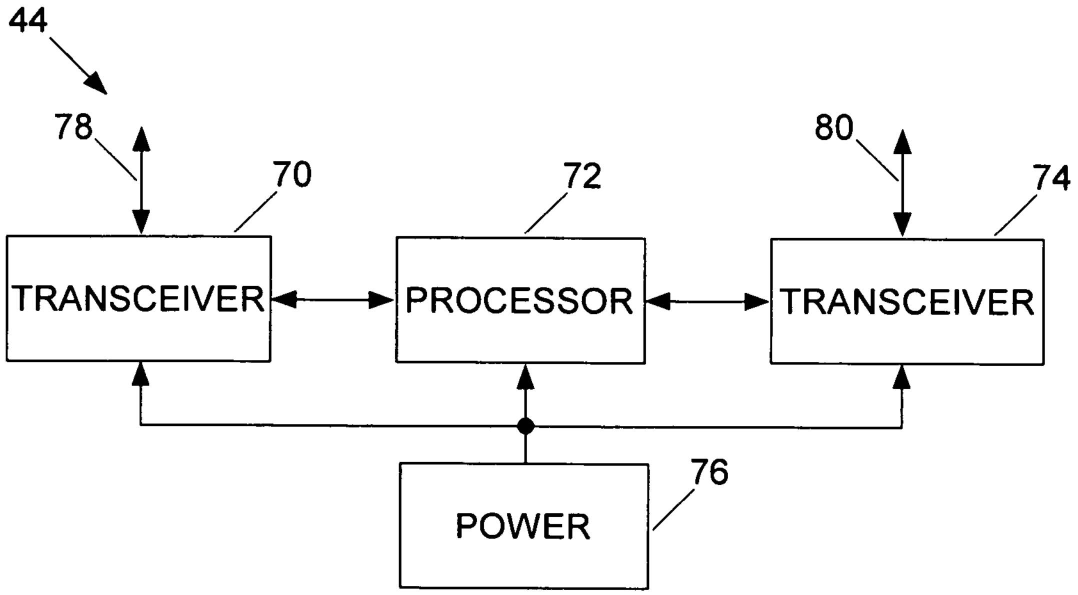
FIG. 6 shows a representative one of the readers of FIG. 4.

A representative one of the readers 44 is shown in FIG. 6. The reader 44 includes a transceiver 70, a processor 72, a transceiver 74, and a power source 76. Although not shown, the reader 44 may also include a memory.

When the user presents the user's smart card 42 to the reader 44, the processor 72 causes the transceiver 74 to send a signal to the door controller 54 that the smart card 42 is being presented to the reader 44. This signal prompts the door controller 54 to transmit appropriate system context to the reader 44. The system context supplied by the door controller 54 is received by the transceiver 74 of the reader 44. The processor 72 causes the system context received from the door controller 54 to be transmitted by the transceiver 70 to the smart card 42. The access decision made and transmitted by the smart card 42 is received by the transceiver 70. The processor 72 causes this decision to be transmitted by the transceiver 74 to the door controller 54.

The processor 72, for example, may be a microcomputer, a programmable gate array, an application specific integrated circuit (ASIC), a dedicated circuit, or other processing entity capable of performing the functions described herein.

The power source 76 may be a battery, or the power source 76 may be a plug connectable to a wall or other outlet, or the power source 76 may be any other device suitable for providing power to the transceiver 70, the processor 72, and the transceiver 74.

The transceiver 70 transmits and receives over a link 78. The link 78 may be a wired link or a wireless link. The transceiver 74 transmits and receives over a link 80. The link 80 may be a wired link or a wireless link.

Figure 7:
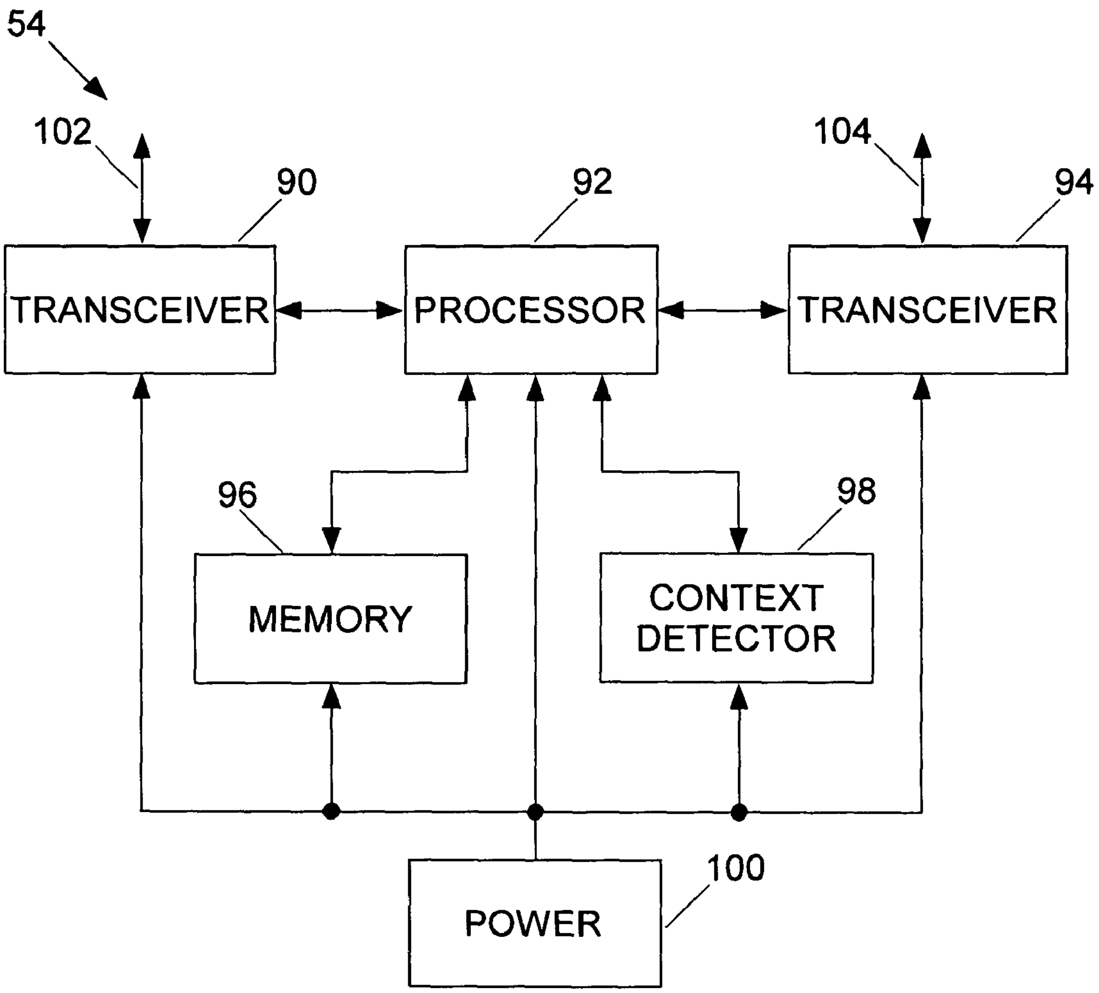
FIG. 7 shows a representative one of the door controllers of FIG. 4.

A representative one of the door controllers 54 is shown in FIG. 7. The door controller 54 includes a transceiver 90, a processor 92, a transceiver 94, a memory 96, one or more context detectors 98, and a power source 100.

When the user presents the user's smart card 42 to the reader 44 and the reader 44 sends a signal requesting the appropriate system context, the transceiver 90 receives this request signal causing the processor 92 to control the transceiver 90 so as to transmit this system context to the reader 44. The system context may be stored in the memory 96. For example, the system context stored in the memory 96 may be user specific and may be stored in the memory 96 by user ID. Thus, when a user's smart card 42 transmits its user ID to the door controller 54 via the reader 44, the door controller 54 transmits back system context specific to the user ID that it has received.

According to one embodiment of the present invention, at least a portion of the system context results from the context detector 98. The context detector 98 may simply be a counter that counts the number of users permitted in the room 48 guarded by the door controller 54. However, the context detector 98 may be arranged to detects additional or other system contexts to be stored in the memory 96 and to be transmitted to the reader 44 and then to the smart card 42.

The transceiver 94 is arranged to exchange communications with the interconnect 50.

The processor 92, for example, may be a microcomputer, a programmable gate array, an application specific integrated circuit (ASIC), a dedicated circuit, or other processing entity capable of performing the functions described herein.

The power source 100 may be a battery, or the power source 100 may be a plug connectable to a wall or other outlet, or the power source 100 may be any other device suitable for providing power to the transceiver 90, the processor 92, the transceiver 94, the memory 96, and the context detector 98.

The transceiver 90 transmits and receives over a link 102. The link 102 may be a wired link or a wireless link. The transceiver 94 transmits and receives over a link 104. The link 104 may be a wired link or a wireless link.

Accordingly, context-sensitive policy enforcement is decentralized. Thus, there is no need for a controller to centrally maintain information about per-user permissions and system context. Instead, access control decisions are made locally, with the door-controllers dynamically maintaining pertinent environmental system context. This de-centralization alleviates the problem of scalability as the number of users and the complexity of the policies grow.

Moreover, the access control system 40 is easy to configure and re-configure. At a high level, the readers 44 and/or the door controllers 54 are equipped with the knowledge of what they are protecting, but not how they are protecting and how should they interact and compose the system context, but not with details about an user's policy or history of activities. The readers 44 and/or door controllers 54 are stateless in this regard, making reconfiguration of the facility easier.

Further, effective decentralization and localization of policy decision making also enables meaningful enforcement of at least some access control policies in the event of a disconnected or partially connected reader 44 and/or door controller 54. For example, policies depending only on a user's past behavior (and not on other system context) can be enforced even if a door controller 54 is disconnected from the system through the interconnect 50.

While secure authorization is not the primary focus of the present invention, existing mechanisms can be used for a basic secure solution. For example, using symmetric key encryption, where all the access agents and the administrator 59 share a secret key k, with which they will be configured at the time of installation (or on a subsequent facility-wide reset operation, if the key is compromised), the per-user policy engine and states can be encrypted with k on the user-carried devices, and the readers 44 and/or the door controllers 54 can decrypt them using k and further write back encrypted states using k on the user-carried devices. This symmetric key encryption ensures security as long as k is not compromised. The policy on the smart card can be certified by a digital certificate and its validity can be verified by using technologies like those developed by Core street.

Certain modifications of the present invention have been discussed above. Other modifications of the present invention will occur to those practicing in the art of the present invention. For example, as described above, the smart cards 42 make the access decision as to whether a user is to be permitted or denied access to a room. The smart card 42 makes this decision based on the policies 52 that it stores and the system context provided by the door controller 54. Instead, the door controller 54 could make the access decision as to whether a user is to be permitted or denied access to a room based on the policies 52 provided by the smart card 42 and the system context stored in the memory 96 of the door controller 54.

Also, the reader 44 and the door controller 54 are shown as separate devices. Instead, their functions may be combined into a single device.

Moreover, the functions of the door controller 54 may be moved to the readers 44 reducing the door controller 54 to a simple lock.

In addition, the connections shown in FIG. 4 may be wired connections, or wireless connections, or a mixture of wired connections and wireless connections.

Furthermore, the door controllers 54 may be arranged to log access decisions in a log file so that the decisions logged in the log file can be subsequently collated by a separate process for book-keeping.

The system context may be detected by individual door controllers through sensors or context detectors 98 either built into the door controllers 54 or otherwise attached to them. An example of this can be the presence of a certain chemical in a room. The system context may also require the collaboration of different door controllers—e.g., to decide if the occupancy of a room is below a certain threshold. Such contexts, along with each of the individual grants/denials to users are all represented as discrete events happening at the respective controllers 54. The policy specification language can also define hierarchical events which are formed out of individual events at different controllers. For example, if event e1 represents the context of "high threshold of a chemical in room A" and event e2 represents the context of "occupancy in room A>=1", then the event e3 defined as "e1 AND e2" represents the system context "personnel hazard in room A". Such events may be specified as part of the policies 52. The analyzer 56 can then translate the event definitions to specific actions on the part of the door controllers 54 by which they will detect system context either individually or in collaboration, as required by the policies.

Moreover, as discussed above, the interconnect 50 of FIG. 4 may include the administrator 59. The system administrator 59 may be used to supply special system contexts that are in addition to any system contexts detected by the context detectors 98. Such special system contexts, for example, may be used to take care of emergency situations including but not limited to revoking the access rights of a rogue user.

Also, the system administrator 59 may be arranged to formally specify policy roles as the policies relate to each user and to assign the users to appropriate ones of these roles.

Usually the policies will not differ across every individual, but are likely to be different across groups of individuals. In this sense, a role refers to a certain policy or groups of policies that is applicable to a certain class of user. For example, a "supervisor" is a role that can include the policy of free access to all rooms, whereas a "regular employee" can be a role that includes policies which allow an entry to certain protected rooms only if a "supervisor" is present.

However, the access control system 40 may also include user-specific authorization policies. An example of this can be a special user who is not a regular employee at a site but needs better structured access control policies as compared to a visitor.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A decentralized access control system whereby access authorization decision making is decentralized, the system comprising:

at least one access controlling device, wherein the access controlling device provides a first parameter that enables a decision relating to access authorization of a user; and, at least one user carried device carried by the user and interacting with the access controlling device, wherein the user carried device stores a second parameter that enables the decision relating to the access authorization of the user at the instance of presenting the user carried device to the access controlling device, wherein the decision is made as a function of both the first parameter and the second parameter, and wherein at least the second parameter relates to an access control policy that provides at least one condition under which access is permitted or denied.

2. The system of claim 1 wherein the at least one access controlling device comprises at least one reader and at least one controller, wherein the at least one reader interacts with the at least one user carried device, wherein the at least one controller interacts with the at least one reader, and wherein the at least one controller provides the first parameter.

3. The system of claim 2 further comprising a plurality of the readers and a plurality of the controllers, wherein each of the plurality of the controllers interacts with a corresponding one of the plurality of the readers.

4. The system of claim 2 further comprising a plurality of the readers and a plurality of the controllers, wherein each of the plurality of the controllers interacts with a corresponding group of the plurality of the readers, and wherein each group comprises at least two of the plurality of the readers.

5. The system of claim 1 wherein the first parameter is system context dependent, and wherein the second parameter is specific to the user of the at least one user carried device.

6. The system of claim 5 wherein the context is dynamic.

7. The system of claim 1 wherein the at least one access controlling device causes the decision to be logged in a log file.

8. The system of claim 1 wherein the first parameter is system context dependent, wherein the system context and the access decisions are abstracted as discrete events.

9. The system of claim 1 further comprising a plurality of the controllers, wherein the plurality of the controllers share an interconnect, wherein the interconnect includes an administrator that supplies special system contexts to the controllers, and wherein the special system contexts are in addition to any system contexts detected by the plurality of the controllers.

10. The system of claim 1 wherein a plurality of access controlling devices collaboratively decide on a system context using an interconnect in addition to detecting system context individually, wherein the interconnect interconnects the access controlling devices.

11. The system of claim 1 wherein a plurality of access controlling devices are interconnected by an interconnect, and wherein the system can tolerate a limited disconnection in the interconnect so long as the access controlling devices that need to collaborate to decide on a system context, if any, stay connected.

12. The system of claim 1 further comprising an administrator, wherein the administrator includes in the second parameter a role of the user and assigns the user to the role.

13. The system of claim 1 wherein the second parameter includes a user-specific authorization policy, wherein the system further comprises a system controller, and wherein the system controller extracts a precise representation of the user-specific authorization policy and provides information on how to compute the decision for the user based on the user-specific authorization policy and the first parameter.

14. The system of claim 1 further including a terminal that changes the second parameter stored on the at least one user carried device.

15. The system of claim 1 wherein the access controlling device is instructed to change the second parameter stored on the user carried device when the user carried device interacts with the access controlling device.

16. The system of claim 1 wherein the access controlling device and/or user carried device is not reconfigured when an administrator modifies access controlling policies.

17. The system of claim 1 wherein the policy comprises a policy unrelated to verification that a user possess a valid user carried device.

18. A smart card useful in a decentralized access control system whereby access authorization decision making is decentralized, the smart card comprising:

a memory storing policy rules that provide conditions under which access is permitted or denied, wherein the policy rules enable decisions to be made at instances of presenting the smart card to an access controller controlling access to a restricted area, and wherein the decisions relate to access to the restricted area by a user of the smart card; and, a processor coupled to the memory and arranged to enable the decisions based upon the policy rules and a system context transmitted to the smart card, wherein the system context is based on an environment relating to the restricted area.

19. The smart card of claim 18 wherein the policy rules include at least one policy rule that is specific to the user.

20. The smart card of claim 18 wherein the memory stores history of activities specific to an user.

* * * * *